US012724263B2

(12) United States Patent
Hao et al.

(10) Patent No.: US 12,724,263 B2
(45) Date of Patent: Sep. 1, 2026

(54) IMAGE GENERATOR, HEAD-UP DISPLAY AND VEHICLE

(71) Applicant: SHENZHEN METALENX TECHNOLOGY CO., LTD, Shenzhen (CN)

(72) Inventors: Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 274 days.

(21) Appl. No.: 18/596,660

(22) Filed: Mar. 6, 2024

(65) Prior Publication Data

US 2024/0210689 A1 Jun. 27, 2024

Related U.S. Application Data

(63) Continuation of application No. PCT/CN2022/098198, filed on Jun. 10, 2022.

(30) Foreign Application Priority Data

Oct. 26, 2021 (CN) ......................... 202111248644.9

(51) Int. Cl.
*G02B 27/01* (2006.01)
*G02B 1/00* (2006.01)

(52) U.S. Cl.
CPC ......... *G02B 27/0101* (2013.01); *G02B 1/002* (2013.01)

(58) Field of Classification Search
CPC .................................................. G02B 27/0101
See application file for complete search history.

(56) References Cited

U.S. PATENT DOCUMENTS

2019/0369401 A1* 12/2019 Rolland ............. G02B 27/0176
2020/0012098 A1* 1/2020 Irzyk ...................... B60K 35/22
2020/0183161 A1* 6/2020 Choi .................. G02B 27/0101
2022/0171209 A1* 6/2022 Moon ................ G02B 27/0172

FOREIGN PATENT DOCUMENTS

CN 108061968 5/2018
CN 112034672 12/2020
CN 112444968 3/2021
CN 113103955 7/2021
EP 3805629 4/2021
JP 2010247630 11/2010

OTHER PUBLICATIONS

"International Search Report (Form PCT/ISA/210) of PCT/CN2022/098198", mailed on Aug. 17, 2022, with English translation thereof, pp. 1-6.

* cited by examiner

*Primary Examiner* — Edmond C Lau
(74) *Attorney, Agent, or Firm* — JCIPRNET

(57) ABSTRACT

Provided is an image generator, a head-up display and a vehicle. The image generator includes an image source and a metasurface. The metasurface is provided at a light-outgoing side of the image source. The image source is configured to emit imaging light, and the imaging light is capable of propagating towards the metasurface. The metasurface is configured to modulate incident imaging light hitting the metasurface, so as to adjust a propagation direction of outgoing imaging light leaving the metasurface and direct the outgoing imaging light leaving the metasurface towards a light-outgoing area of the image generator.

13 Claims, 10 Drawing Sheets

IMAGE GENERATOR, HEAD-UP DISPLAY AND VEHICLE

CROSS-REFERENCE TO RELATED APPLICATION

This application is a continuation of International Patent Application of PCT application serial No. PCT/CN2022/098198, filed on Jun. 10, 2022, which claims the benefit of priority from China Application No. 202111248644.9, filed on Oct. 26, 2021. The content of the aforementioned applications, including any intervening amendments thereto, are incorporated herein by reference.

BACKGROUND

Technical Field

The present disclosure relates to the field of image display, in particular to an image generator, a head-up display and a vehicle.

Description of Related Art

A Head-Up Display system, often referred to as a HUD system, is positioned in a driver's visual field, which is beneficial to the driver's blindfolded operations. The HUD system projects a multi-functional instrument panel that presents important driving information such as speed and navigation onto a windshield in front of the driver, so that the information is obtainable without requiring the driver to look down or turn the neck.

The existing HUD system consists of a picture generation unit (PGU), an amplifier and a windshield. Whereas, most of the existing amplifiers have a reflective optical path and may have a free-form surface, and thus intractable problems exist, for example, it is complicated and costly to process the free-form surface, and the existing HUD system is hardly assembled and typically bulky.

SUMMARY

In view of the above technical problems, an image generator, a head-up display and a vehicle are provided according to embodiments of the present disclosure.

In an embodiment, the metasurface includes a reflective metasurface; and the reflective metasurface includes a plurality of reflective unit cells; the reflective unit cells are configured to modulate at least part of incident imaging light hitting the reflective unit cells, so as to adjust a propagation direction of outgoing imaging light leaving the reflective unit cells; and a reverse extension line of the outgoing imaging light leaving the reflective unit cells passes through the enlarged virtual image.

In an embodiment, an opening formed between the at least part of the incident imaging light hitting the reflective unit cells and the outgoing imaging light leaving the reflective unit cells faces towards a first reflection reference position that is preset; and the reflective unit cells are configured to modulate incident imaging light vertically hitting the reflective unit cells and direct corresponding outgoing imaging light to a second reflection reference position that is preset; and both the first reflection reference position and the second reflection reference position are arranged on a side of the reflective metasurface close to the image source; and a distance between the first reflection reference position and the reflective metasurface is greater than a distance between the second reflection reference position and the reflective metasurface.

In an embodiment, a difference between a first distance and a second distance is less than a preset value; the first distance refers to a distance between the incident imaging light hitting the reflective unit cells and the first reflection reference position in a direction perpendicular to a principal optic axis of the reflective metasurface; and the second distance refers to a distance between the outgoing imaging light leaving the reflective unit cells and the first reflection reference position in the direction perpendicular to the principal optic axis of the reflective metasurface.

In an embodiment, the distance between the first reflection reference position and the reflective metasurface is twice the distance between the second reflection reference position and the reflective metasurface; and the first distance is equal to the second distance.

In an embodiment, the reflective metasurface includes a reflective layer, a substrate layer and a plurality of nanostructures; the reflective layer is adhered to the substrate layer; and the nanostructures are provided on a side of the reflective layer close to the image source.

In an embodiment, the substrate layer is provided on a side of the reflective layer away from the image source; the nanostructures are provided on the reflective layer, and provided on the side of the reflective layer close to the image source; or the substrate layer is transparent; the substrate layer is provided on the side of the reflective layer close to the image source; and the nanostructures are provided on the substrate layer, and provided on a side of the substrate layer close to the image source.

In an embodiment, the nanostructures are provided on a flat surface; or the nanostructures are provided on an inwardly curved surface.

In an embodiment, the metasurface includes a transmissive metasurface; and the transmissive metasurface includes a plurality of transmissive unit cells; the transmissive unit cells are transmissive to incident imaging light entering the transmissive unit cells, and are configured to adjust a propagation direction of outgoing imaging light passing through the transmissive unit cells; and the outgoing imaging light passing through the transmissive unit cells is capable of forming the enlarged virtual image.

In an embodiment, a first deflection angle of the incident imaging light entering the transmissive unit cells relative to a transmission reference position is larger than or equal to a second deflection angle of the outgoing imaging light passing through the transmissive unit cells relative to the transmission reference position; and the transmission reference position is coplanar with the transmissive metasurface.

In an embodiment, for at least part of the incident imaging light entering the transmissive unit cells, a difference between a cotangent value of the second deflection angle and a cotangent value of the first deflection angle is a constant value; and the constant value is positively correlated to a distance from the transmissive unit cells to the transmission reference position.

In an embodiment, an optical axis of the imaging light emitted by the image source is parallel to a principal optic axis of the transmissive metasurface.

In an embodiment, the image generator further includes a reflective element; the image source and the transmissive metasurface are provided on a same side of the reflective element; and the reflective element is configured to reflect imaging light incident on the reflective element to the light-outgoing area of the image generator.

In an embodiment, the image source, the transmissive metasurface and the reflective element are collinear, and the transmissive metasurface is arranged between the image source and the reflective element; the reflective element is configured to reflect outgoing imaging light passing through the transmissive metasurface; or the image source, the transmissive metasurface and the reflective element are not collinear, and the reflective element is configured to reflect the imaging light emitted from the image source to the transmissive metasurface.

In an embodiment, the transmissive metasurface includes a transparent substrate layer and a plurality of nanostructures provided on the transparent substrate layer.

In an embodiment, the imaging light is polarized; respective nanostructures have a pillar structure with a central axis in a height direction of the respective nanostructures; and intersection of the respective nanostructures with a first plane forms a first intersection line, and intersection of the respective nanostructures with a second plane form a second intersection line; the first plane and the second plane are perpendicular to each other and both pass through the central axis; the second intersection line does not coincide completely with the first intersection line after rotating 90° around the central axis.

In an embodiment, the image source includes a first display capable of emitting polarized light; or the image source includes a second display, a polarizer and a quarter-wave plate, and both the polarizer and the quarter-wave plate are arranged between the second display and the metasurface; light emitted from the second display hits the metasurface after passing through the polarizer and the quarter-wave plate in sequence.

In a second aspect of the present embodiment, a head-up display is provided. The head-up display includes a reflective imaging device and the image generator as described in any of the above embodiments; and the reflective imaging device is configured to reflect outgoing imaging light leaving the image generator to an observation area.

In an embodiment, the head-up display further includes an anti-reflection film; and the anti-reflection film is provided on a side of the reflective imaging device away from the image generator.

In a third aspect of the present embodiment, a vehicle is provided. The vehicle includes the head-up display as described in any of the above embodiments.

In the first aspect of the above embodiment, the metasurface modulates the imaging light from the image source, such that outgoing imaging light reaching the light-outgoing area of the image generator is capable of forming the enlarged virtual image of the image source 10, thereby facilitating subsequent imaging and the display which is achieved by virtue of the enlarged virtual image. Compared to traditional optical components that have a reflective optical path and may have a free-form surface, the metasurface is designed to have a reflection phase or a transmission phase, so as to easily integrate various functions of higher-order curved surfaces and free-form surfaces, thereby forming an enlarged virtual image. Such configuration can greatly reduce the required optical components within the traditional image generator, lower the difficulty of assembly and have a compact size. In addition, the metasurface can be mass-produced by semiconductor processing, thereby realizing high productivity, simplified processing, cost saving and high yield.

In order to make the foregoing objects, features and advantages of the present disclosure more obvious and understandable, preferred embodiments are given below in detail with reference to the accompanying drawings.

BRIEF DESCRIPTION OF THE DRAWINGS

In order to explain embodiments of the present disclosure or the prior art more clearly, drawings used in the description of the embodiments or the prior art will be briefly explained below. Obviously, the following drawings are merely for exemplary and explanatory purposes. It is understood by those skilled in the art that without paying any creative efforts, other drawings are available based on the following drawings.

DESCRIPTION OF THE EMBODIMENTS

It should be understood that terms used in the present disclosure, such as "central", "longitudinal", "transverse", "length", "width", "thickness", "upper", "lower", "front", "rear", "left", "right", "vertical", "horizontal", "top", "bottom", "interior", "exterior", "clockwise", "counterclockwise" which are intended to indicate orientational or positional relationships based on the accompanying drawings are only for the purpose of describing the present disclosure conveniently and simply, and are not intended to indicate or imply a particular orientation, a structure and an operation in a particular orientation of the device or element referred to herein, and thus are not to be interpreted as a limitation to the present disclosure.

In addition, terms "first" and "second" are used for descriptive purposes, and are not intended to indicate or imply relative importance or implicitly indicate the quantity of the indicated technical features. Therefore, features defined by "first" or "second" may explicitly or implicitly include one or more of these features. In the description of the present disclosure, "plurality" or "multiple" means that there are two or more of these features, unless otherwise explicitly and specifically defined.

In the present disclosure, unless otherwise clearly stated and defined, terms "assemble", "connect", "joint", "fix" and the like should be understood in a broad sense. For example, these terms may be referred to as "fixedly connect", "detachably connect", or "integrally connected"; these terms may also be referred to as "mechanically connect" or "electrically connect"; these terms may be further referred to as "directly connect", "indirectly connected by an intermediary" or "communicated between an interior of an element and an interior of another element". It is understandable to a person having ordinary skill in the art that the terms set forth are interpreted according to specific scenarios of the present disclosure.

Figure 1:
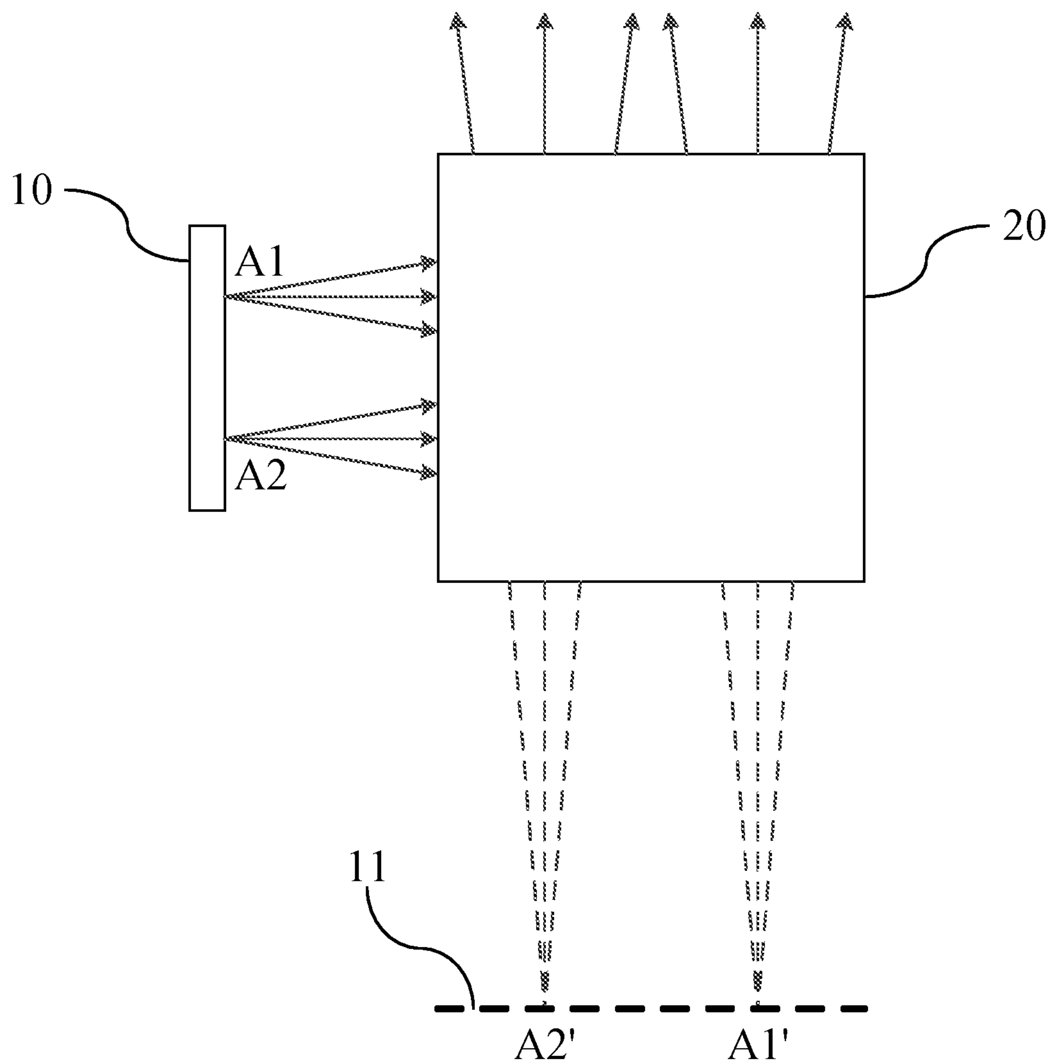
FIG. 1 schematically shows an overall structure of an image generator according to an embodiment of the present disclosure.

The present embodiment provides an image generator. Referring to FIG. 1, the image generator includes an image source 10 and a metasurface 20. The metasurface 20 is provided at a light-outgoing side of the image source 10. The image source 10 is configured to emit imaging light, and the imaging light is capable of propagating towards the metasurface 20. The metasurface 20 is configured to modulate incident imaging light hitting the metasurface, so as to adjust a propagation direction of outgoing imaging light leaving the metasurface and direct the outgoing imaging light leaving the metasurface towards a light-outgoing area of the image generator. The metasurface 20 is also configured to form an enlarged virtual image 11 of the image source 10.

In the present embodiment, the image source 10 is capable of emitting imaging light. The imaging light goes outwards from the light-outgoing side of the image source 10. The image source 10 may be an active imaging system or a passive imaging system, for example, the image source 10 may be a liquid-crystal display. The image source 10 may also be a projection system, for example, a picture generation unit (PGU) projects an image to be displayed onto a diffuser. The diffuser is used as an intermediate image plane and is used to emit the imaging light. The imaging light is capable of propagating towards the metasurface 20 that is arranged at the light-outgoing side of the image source 10, such that the metasurface 20 modulates the imaging light. As shown in FIG. 1, a right side of the image source 10 is the light-outgoing side of the image source 10. The imaging light propagates towards the metasurface 20 and hits the metasurface 20. The metasurface 20 adjusts a propagation direction of the outgoing imaging light leaving the metasurface and directs the outgoing imaging light towards the light-outgoing area of the image generator. As shown in FIG. 1, an upper side of the metasurface 20 is the light-outgoing area of the image generator. The imaging light being modulated by the metasurface 20 propagates upwards from the upper side of the metasurface 20.

The metasurface 20 is an optical element manufactured by metasurface related technologies. The metasurface 20 is also capable of reducing a divergence angle of the imaging light, thereby forming an enlarged virtual image of the image source 10. Referring to FIG. 1, taking two pixel points A1 and A2 on the image source 10 as an example, imaging light from the two pixel points A1 and A2 is modulated by the metasurface 20 to propagate upwards from the metasurface 20. Outgoing imaging light forms the enlarged virtual image 11, in other words, a reverse extension line of the outgoing imaging light intersects at the enlarged virtual image 11. The two pixel points A1 and A2 respectively correspond to two virtual images A1' and A2'.

In the image generator of the present embodiment, the metasurface 20 modulates the imaging light from the image source 10, such that outgoing imaging light reaching the light-outgoing area of the image generator is capable of forming the enlarged virtual image of the image source 10, thereby facilitating subsequent imaging and display which is achieved by virtue of the enlarged virtual image. Compared to traditional optical components that have a reflective optical path and may have a free-form surface, the metasurface 20 is designed to have a reflection phase or a transmission phase, so as to easily integrate various functions of higher-order curved surfaces and free-form surfaces, thereby forming an enlarged virtual image. Such configuration can greatly reduce the required optical components within the traditional image generator, lower the difficulty of assembly and have a compact size. In addition, the metasurface 20 can be mass-produced by semiconductor processing, thereby realizing high productivity, simplified processing, cost saving and high yield.

On the basis of the above embodiment, the metasurface 20 adjusts a propagation direction of outgoing imaging light by a way similar to reflection, such that the propagation direction of outgoing imaging light leaving the metasurface is different from a propagation direction of incident imaging light hitting the metasurface. Additionally, the metasurface 20 is also capable of adjusting the divergence angle of the imaging light to form an enlarged virtual image 11. Thus, the reflection of the imaging light by the metasurface 20 is not a specular reflection, substantially being slightly similar to, and not exactly the same as the specular reflection. In the present embodiment, the "reflection" of the imaging light by the metasurface 20 is referred to as "analogous reflection" or "quasi reflection".

Figure 2:
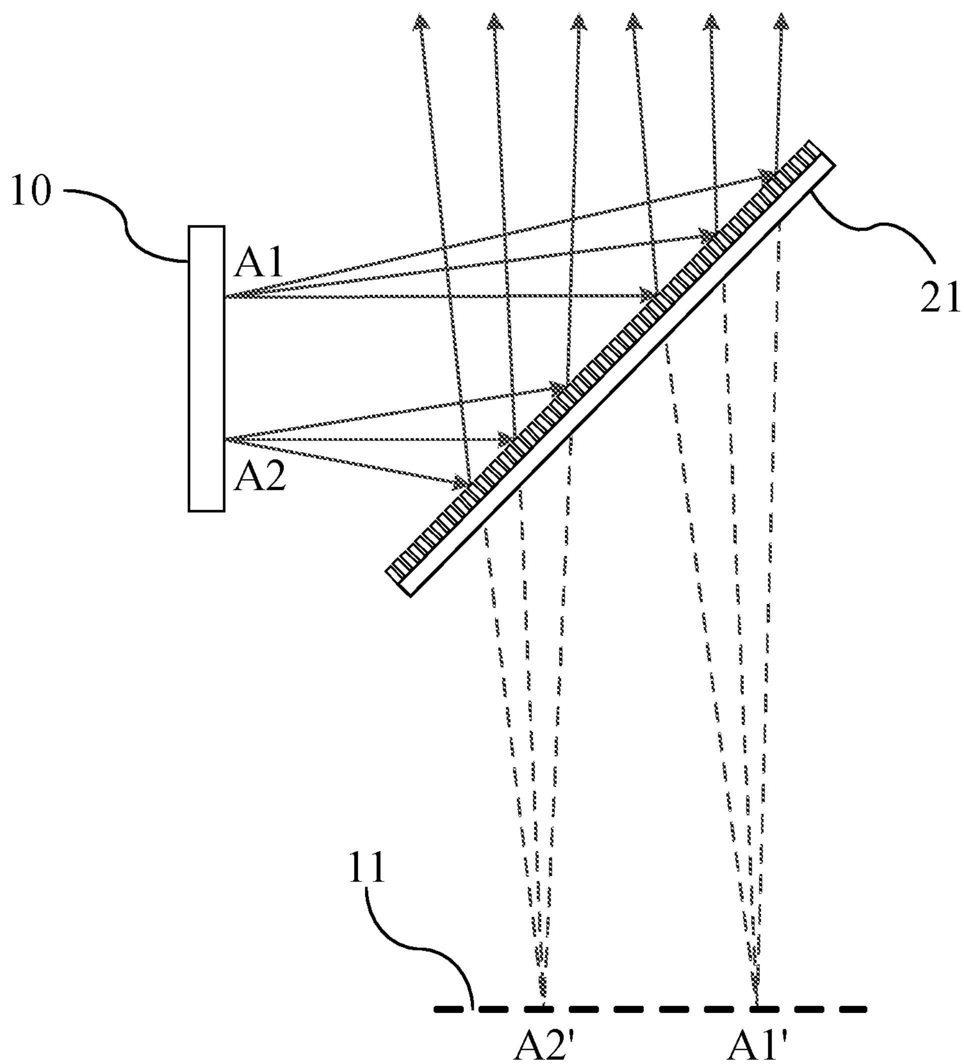
FIG. 2 schematically shows a first structure of an image generator according to an embodiment of the present disclosure.

As shown in FIG. 2, the metasurface 20 includes a reflective metasurface 21. The reflective metasurface 21 adjusts a propagation direction of outgoing imaging light by a way of "analogous reflection" or "quasi reflection". The reflective metasurface 21 includes a plurality of reflective unit cells. The reflective unit cells are configured to modulate at least part of incident imaging light hitting reflective unit cells, so as to adjust a propagation direction of outgoing imaging light leaving the reflective unit cells. A reverse extension line of the outgoing imaging light leaving the reflective unit cells passes through the enlarged virtual image 11.

In the present embodiment, the reflective metasurface 21 includes a plurality of reflective unit cells. At least a part of reflective unit cells provide phase compensation for light hitting the reflective unit cells, so as to adjust a propagation direction of outgoing imaging light, thereby realizing the quasi reflection. Where, the configuration of "the reflective metasurface 21 includes a plurality of reflective unit cells" is intended to express that the reflective metasurface 21 is abstractively divided into a plurality of reflective unit cells, and is not intended to limit the plurality of reflective unit cells to be completely independent of each other in structure. The plurality of reflective unit cells may be in one piece, or, at least a part of reflective unit cells are independent in structure. In an embodiment, different reflective unit cells are arranged on a same substrate, optionally, different reflective unit cells are arranged at different positions of the same substrate. Respective reflective unit cells are partial structures obtained by conceptually partitioning the reflective metasurface 21.

As shown in FIG. 2, the imaging light emitted from the image source 10 hits corresponding reflective unit cells of the reflective metasurface 21. The reflective unit cells modulates at least part of light hitting the reflective unit cells, so as to adjust a propagation direction of outgoing imaging light leaving the reflective unit cells and reduce the divergence angle of the imaging light, such that reverse extension lines of the imaging light from a certain pixel point of the image source 10 intersect at a certain position or in a certain area. Since the outgoing imaging light has a smaller divergence angle, an enlarged virtual image 11 is formed.

Optionally, in order to form the enlarged virtual image 11 by the reflective metasurface 21, two virtual reference positions are provided for the reflective metasurface 21 in the present embodiment. The two virtual reference positions include a first reflection reference position and a second reflection reference position. The first reflection reference position and the second reflection reference position are arranged on a same side of the reflective metasurface 21. Specifically, the first reflection reference position and the second reflection reference position are arranged on a side of the reflective metasurface 21 that is close to the image source 10. A distance between the first reflection reference position and the reflective metasurface 21 is greater than a distance between the second reflection reference position and the reflective metasurface 21. That is, the first reflection reference position is farther from the reflective metasurface 21; and the second reflection reference position is closer to the reflective metasurface 21.

Figure 3:
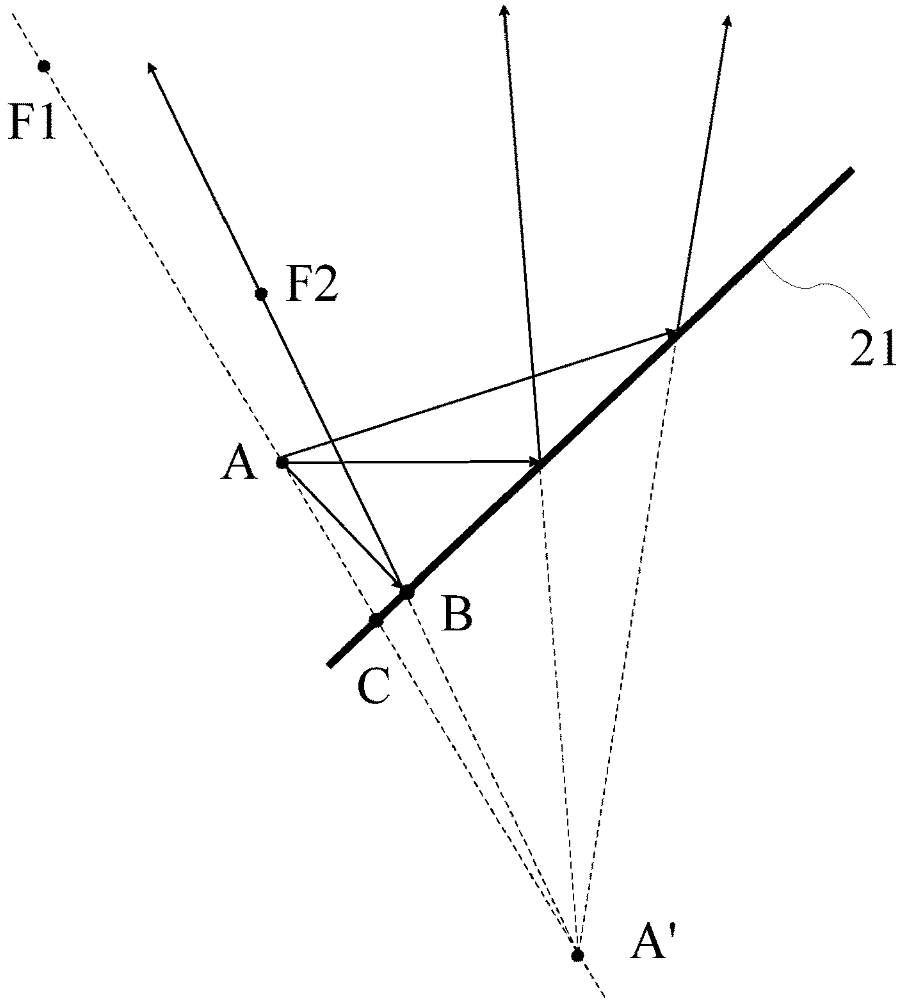
FIG. 3 is an imaging diagram of a reflective metasurface according to an embodiment of the present disclosure.

Referring to FIG. 3, the first reflection reference position F1 and the second reflection reference position F2 are both located on the same side of the reflective metasurface 21 (i.e., an upper left side of the reflective metasurface in FIG. 3). Compared to the second reflection reference position F2, the first reflection reference position F1 is farther away from the reflective metasurface 21. A point A as shown in FIG. 3 represents a pixel point of the image source 10. All of the point A, the first reflection reference position F1 and the second reflection reference position F2 are arranged on the same side of the reflective metasurface 21. The reflective metasurface 21 quasi-reflects the imaging light from the point A, thereby forming a virtual image A' of the point A. In addition, the virtual image A' is an enlarged virtual image. Thus, compared with the point A, the point A' is further away from the reflective metasurface 21.

In the present embodiment, the reflective unit cells modulate incident imaging light vertically hitting the reflective unit cells and enable outgoing imaging light to travel towards the second reflection reference position that is preset. As shown in FIG. 3, imaging light from the pixel point A vertically hits a reflective unit cell at a point B of FIG. 3. The reflective unit cell at the point B is capable of quasi-reflecting the imaging light to the second reflection reference position F2. Furthermore, an opening formed between at least part of light hitting the reflective unit cell and outgoing light faces towards the first reflection reference position. As shown in FIG. 3, an opening (i.e., an opening ABF2) formed by a light beam AB and a light beam BF2 faces towards the first reflection reference position F1, where the light beam AB refers to incident light hitting the reflective unit cell at the point B; and the light beam BF2 refers to outgoing light that is obtained by quasi-reflecting the light beam AB by virtue of the reflective unit cell at the point B. A reverse extension line of the light beam BF2 passes through the virtual image A'. Additionally, light emitted from the pixel point A travels towards a point C on the reflective metasurface 21 along a direction F1A. Since an opening formed between the incident light and the quasi-reflected light faces toward the first reflection reference position F1, a reflective unit cell corresponding to the point C reflects the light AC, that is, the light AC is quasi-reflected and the quasi-reflected light travels along a direction CA. The incident light AC and the quasi-reflected light CA overlap each other, but travel in the opposite direction. Furthermore, a reverse extension line of the quasi-reflected light CA passes through the virtual image A'. Light that is emitted by the pixel point A in the image source 10 and that hits other reflective unit cells of the reflective metasurface 21 can also be quasi-reflected by the other reflective unit cells; and a reverse extension line of the quasi-reflected light also passes through the virtual image A'. Light emitted by other pixel points in the image source 10 can also be quasi-reflected by the corresponding reflective unit cells; and a reverse extension line of the quasi-reflected light passes through a corresponding position of the enlarged virtual image, such that an enlarged virtual image 11 of the image source 10 is formed.

It is noted that the optical path shown in FIG. 3 depicts an ideal situation. Whereas, in a real situation, due to the insufficient accuracy of the manufacturing process or the distortion of the image source 10 which is required to be compensated, reverse extension lines of the quasi-reflected light may not intersect in an accurate way. For example, after the light emitted from the pixel point A is quasi-reflected by the reflective unit cells, reverse extension lines of all the quasi-reflected light may not intersect at the point A'. Therefore, the configuration "the reverse extension line of the light passes through the enlarged virtual image or passes through the virtual image A'" recited in the present embodiment is intended to express that the reverse extension line of the light can be regarded as passing through the enlarged virtual image or passing through the virtual image A', or is intended to express that a distance between the reverse extension line of the light and the virtual image (the enlarged virtual image or the virtual image A') is less than a preset value.

In addition, optionally, the "quasi-reflection" of incident light by the reflective unit cells, being different from traditional reflection, mainly intends to express that the incident light and the quasi-reflected light are oppositely distributed on two sides of the first reflection reference position F1, at the same time, the first reflection reference position F1 is located as close as possible to a middle position between the incident light and the quasi-reflected light.

In the present embodiment, a first distance refers to a distance between the incident imaging light hitting the reflective unit cells and the first reflection reference position F1, in a direction perpendicular to a principal optic axis of the reflective metasurface 21; and a second distance refers to a distance between the outgoing imaging light leaving the reflective unit cell and the first reflection reference position F1, in the direction perpendicular to the principal optic axis of the reflective metasurface 21. The first distance and the second distance are nearly equal, that is, a difference between the first distance and the second distance is less than a preset value. The present embodiment constrains the difference between the first distance and the second distance to reduce the divergence angle of the incident imaging light hitting the reflective metasurface 21.

Specifically, the first reflection reference position F1 and the second reflection reference position F2 are two positions on the principal optic axis of the reflective metasurface. Generally, the principal optic axis of the reflective metasurface is perpendicular to the reflective metasurface. Thus, a straight line passing through the first reflection reference position F1 and the second reflection reference position F2 is perpendicular to the reflective metasurface. Referring to a coordinate system shown in FIG. 4, a straight line passing through the first reflection reference position F1 and the second reflection reference position F2 is an x-axis of the coordinate system; and a line that is coincident with the reflective metasurface 21 is a y-axis of the coordinate system. That is, the principal optic axis of the reflective metasurface 21 is the x-axis of the coordinate system.

Figure 4:
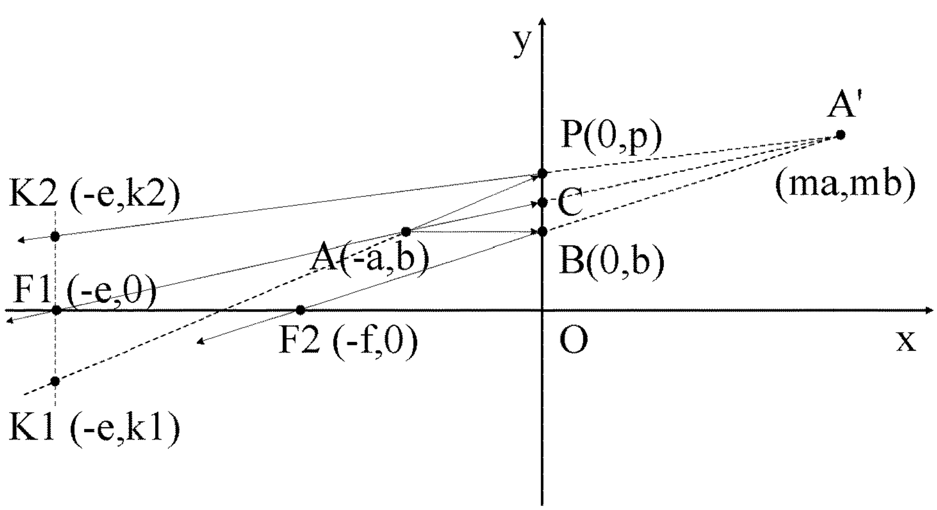
FIG. 4 schematically shows an imaging principle of a reflective metasurface based on a coordinate system according to an embodiment of the present disclosure.

Referring to FIG. 4, a pixel point A of the image source 10 is shown. Coordinates of the pixel point A are (−a, b), where a>0. The first reflection reference position F1 and the second reflection reference position F2 are shown on a left side of the y-axis. In the present embodiment, coordinates of the point F1 are (−e, 0), and coordinates of the point F2 are (−f, 0), e>f>0; where, the symbol "e" represents a distance between the first reflection reference position F1 and the reflective metasurface 21; the symbol "f" represents a distance between the second reflection reference position F2 and the reflective metasurface element 21; and the symbol "a" approximately represents a distance between the image source 10 and the reflective metasurface 21.

As mentioned above, a light beam emitted from the pixel point A is vertically incident on the point B (0, b) of the reflective metasurface 21, and the reflective unit cell at the point B modulates (quasi-reflects) the light AB and enables the outgoing light to propagate towards the second reflection reference position F2, that is, the outgoing light (also called quasi-reflected light) is BF2. Moreover, if light emitted from the pixel point A propagates towards the reflective metasurface along a direction F1A, the light is incident on the point C of the reflective metasurface 21. An opening between the incident light AC and the quasi-reflected light leaving the point C is oriented towards the first reflection reference position F1, thus, the quasi-reflected light leaving the point C propagates away from the reflective metasurface along a direction CF1, that is, the quasi-reflected light is CF1. Reverse extension lines of the quasi-reflected light BF2 and CF1 intersect at the point A', consequently, the point A' is a virtual image of the pixel point A.

Coordinates of the pixel point A are (−a, b), and coordinates of the point F1 are (−e, 0), thus, the equation of the straight line AF1 is shown as follows:

$$y = \frac{b}{e-a}(x+e).$$

Coordinates of the point B are (0, b), and coordinates of the point F2 are (−f, 0), thus, the equation of the straight line BF2 is shown as follows:

$$y = \frac{b}{f}x + b.$$

Based on the equation of the straight line AF1 and the equation of the straight line BF2, coordinates of an intersection point (i.e., the point A') of the straight line AF1 and the straight line BF2 are calculated to be $$\left(\frac{fa}{e-f-a}, \frac{eb-fb}{e-f-a}\right).$$

In order to ensure that the virtual image A' is formed, the point A' and the pixel point A are oppositely arranged on two sides of the reflective metasurface. Thus, $$\frac{fa}{e-f-a} > 0,$$

i.e., e−f>a.

In order to ensure that an enlarged virtual image is formed, the pixel point A is closer to the reflective metasurface, compared to the virtual image point A'. In other words, the pixel point A is closer to the y-axis. Thus, $$\frac{fa}{e-f-a} > a,$$

consequently, e−2f<a. Therefore, by differently positioning the first reflection reference position (−e, 0), the reflective metasurface generates an enlarged virtual image of pixel points with an abscissa "−a" that satisfies a condition of e−2f<a<e−f. For example, if e=2f, it is obtainable to form an enlarged virtual image of the image source 10 whose distance "a" from the reflective metasurface 21 meets a condition of a<f. Generally, e≥2f.

In addition, optionally, a reflective unit cell through which the principal optic axis of the reflective metasurface 21 passes mainly reflects light. That is, the reflective unit cell at the origin O of the coordinate system in FIG. 4 is configured to reflect light, that is, the straight line A'O passes through a point (a, b). In order to form a virtual image at the point A', coordinates of the virtual image A' may be m(a, b) or (ma, mb), if the reflective metasurface 21 produces an image of the image source 10 that is magnified by a factor of m. Thus, f=e−f, that is, e=2f, where the symbol "e" refers to a distance between the first reflection reference position F1 and the reflective metasurface 21; and the symbol "f" refers to a distance between the second reflection reference position F2 and the reflective metasurface 21. Coordinates of the virtual image A' are $$\left(\frac{fa}{f-a}, \frac{fb}{f-a}\right),$$

that is, $$m = \frac{f}{f-a}.$$

For any reflective unit cell P in the reflective metasurface 21, if coordinates of the reflective unit cell P are set to be (0, p), the equation of the light line AP hitting the point P from any pixel point A (−a, b) is described as follows:

$$y = \frac{p-b}{a}x + p.$$

In a direction perpendicular to the principal optic axis of the reflective metasurface 21, in other words, in a direction perpendicular to the x-axis (or in a direction parallel to the y-axis), a line passing through the first reflection reference position F1 and the incident light AP intersect at the point K1 (−e, k1), then, the first distance is equal to a distance between the point F1 and the point K1, i.e., the first distance is equal to |k1|, where the first distance refers to a distance between the first reflection reference position F1 and the incident light AP. According to the equation of the line AP, the following formula is obtained:

$$k1 = \frac{b-p}{a}e + p.$$

Coordinates of the virtual image A' are (ma, mb), and the equation of the light A'P obtained by quasi-reflection by virtue of the reflective unit cell P is described as follows:

$$y = -\frac{p-mb}{ma}x + p.$$

Analogously, in a direction perpendicular to the principal optic axis of the reflective metasurface 21, in other words, in a direction perpendicular to the x-axis (or in a direction parallel to the y-axis), a line passing through the first reflection reference position F1 and the quasi-reflected light A'P intersect at the point K2 (−e, k2), then, the second distance is equal to a distance between the point F1 and the point K2, i.e., the second distance is equal to |k2|, where the second distance refers to a distance between the first reflection reference position F1 and the quasi-reflected light A'P. According to the equation of the quasi-reflected line A'P, the following formula is obtained:

$$k2 = \frac{p-mb}{ma}e + p.$$

The point K1 and the point K2 are oppositely arranged on two sides of the first reflection reference position F1(−e,0), thus, one of k1 and k2 is a positive number and the other one is a negative number. Therefore, a difference between the first distance and the second distance is |k1+k2|, and $$m = \frac{f}{f-a},$$

e=2f. Based on the above, the following derivatives are given:

$$|k1 + k2| = \frac{b-p}{a}e + p + \frac{p-mb}{ma}e + p = \frac{mb - mp + p - mb}{ma} \times$$

-continued $$2f + 2p = 2f\frac{1-m}{ma}p + 2p = 2f\frac{1-\frac{f}{f-a}}{\frac{f}{f-a}a}p + 2p =$$

$$2f\frac{f-a-f}{fa}p + 2p = -2p + 2p = 0$$

That is, the difference between the first distance and the second distance is equal to 0, i.e., |k1+k2|=0. Thus, the first distance and the second distance are equal.

In the present embodiment, when the reflective unit cells quasi-reflect the incident light, the first reflection reference position F1 is used as a reference point to constrain a difference between the first distance and the second distance in the direction perpendicular to the principal optic axis of the reflective metasurface 21, such that the first reflection reference position F1 is located as close as possible to the middle position between the incident light and the quasi-reflected light, thereby reducing the divergence angle of the incident light and thus forming an enlarged virtual image, for example, forming an image of the image source 10 that is magnified by a factor of m, and resulting in better imaging performance.

It is understandable to those skilled in the art that the first reflection reference position F1 and the second reflection reference position F2 are intended to describe two positions, so as to clearly explain the function of the reflective metasurface 21, but are not intended to limit that there are structural features at the first reflection reference position F1 and the second reflection reference position F2.

Figure 5:
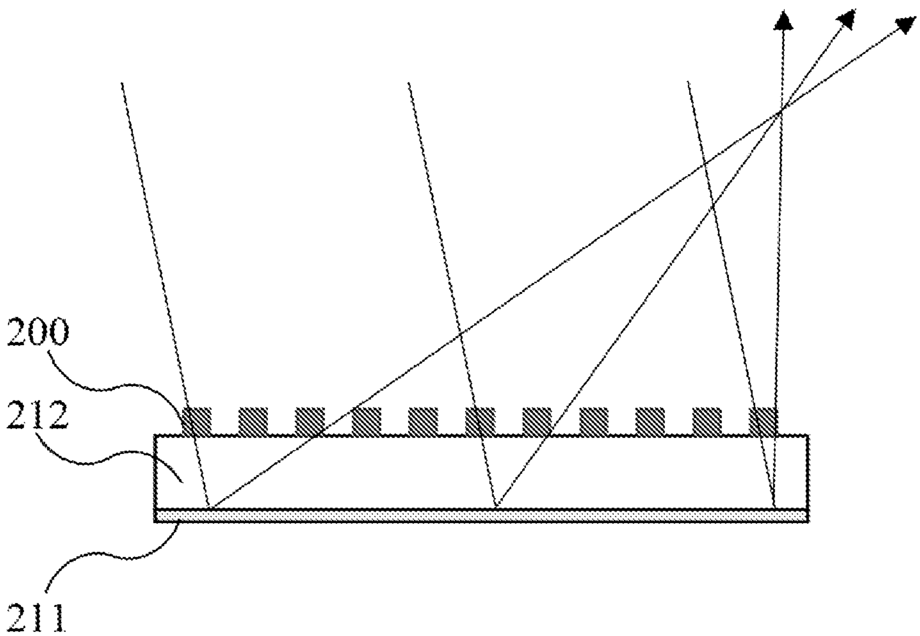
FIG. 5 schematically shows a structure of a reflective metasurface according to an embodiment of the present disclosure.
Figure 6:
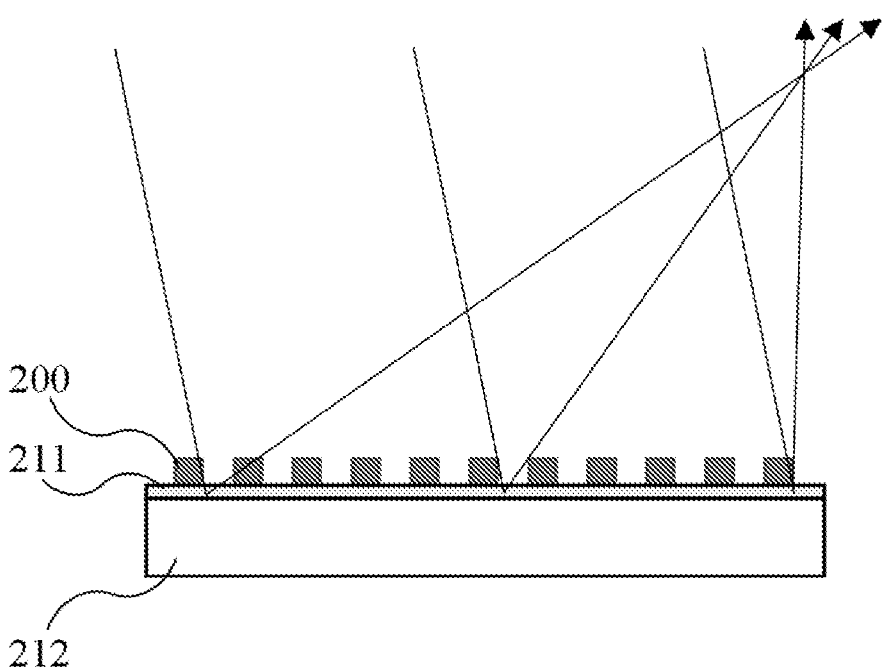
FIG. 6 schematically shows another structure of a reflective metasurface according to an embodiment of the present disclosure.

Based on the above embodiments, as shown in FIG. 5 and FIG. 6, the reflective metasurface 21 includes a reflective layer 211, a substrate layer 212 and a plurality of nanostructures 200; the reflective layer 211 and the substrate layer 212 are adhered to each other. The plurality of nanostructures 200 are arranged at a side of the reflective layer 211 close to the image source 10. Or, as shown in FIG. 6, the substrate layer 212 is arranged on the side of the reflective layer 211 away from the image source 10; the plurality of nanostructures 200 are disposed on the reflective layer 211 and located on the side of the reflective layer 211 close to the image source 10.

In the present embodiment, the reflective metasurface 21 includes a reflective layer 211 which has high reflectivity for visible light. For example, the reflective layer 211 may have a thickness of 300-2000 nm and be a metal layer made of aluminum, silver, gold, chromium, etc. The nanostructures 200 are arranged between the reflective layer 211 and the image source 10. The nanostructures 200 are made of materials that are transparent in the visible spectrum, for example, being made of titanium oxide, silicon oxide, silicon nitride, gallium nitride, gallium phosphide, aluminum oxide or hydrogenated amorphous silicon. Optionally, the nanostructures 200 are filled with air or other materials that are transparent in the visible spectrum. Furthermore, a difference between the refractive index of the filler materials and the refractive index of the nanostructures 200 needs to be greater than or equal to 0.5.

The reflective metasurface 21 also includes a substrate layer 212 configured to serve as a support. As shown in FIG. 5, the substrate layer 212 is located between the reflective layer 211 and the nanostructures 200. In this case, the substrate layer 212 is required to be made of materials that are transparent in the visible spectrum; the materials of the substrate layer 212 are different from both of materials of the nanostructures 200 and the filler materials filled between the nanostructures 200; and the materials of the substrate layer 212 may be quartz glass, crown glass, flint glass, etc. Alternatively, as shown in FIG. 6, the substrate layer 212 is arranged on a back-lighting side of the reflective layer 211. Under this condition, the substrate layer 212 may be opaque or be transparent in the visible spectrum, the present disclosure is not limited thereto. Where, the reflective layer 211 may be a layer coated on a side of the substrate layer 212.

In addition, as shown in FIG. 5 and FIG. 6, the reflective metasurface 21 is capable of focusing parallel incident light. As mentioned above, if the incident light perpendicularly hits the reflective metasurface 21, the quasi-reflected light converges at the second reflection reference position F2; and, based on the equation of the incident light AP and the equation of the quasi-reflected light A'P in FIG. 4, it proves that for the parallel incident light that hits the reflective metasurface 21 in other directions, the obtained quasi-reflected light is capable of converging at other positions.

Figure 7:
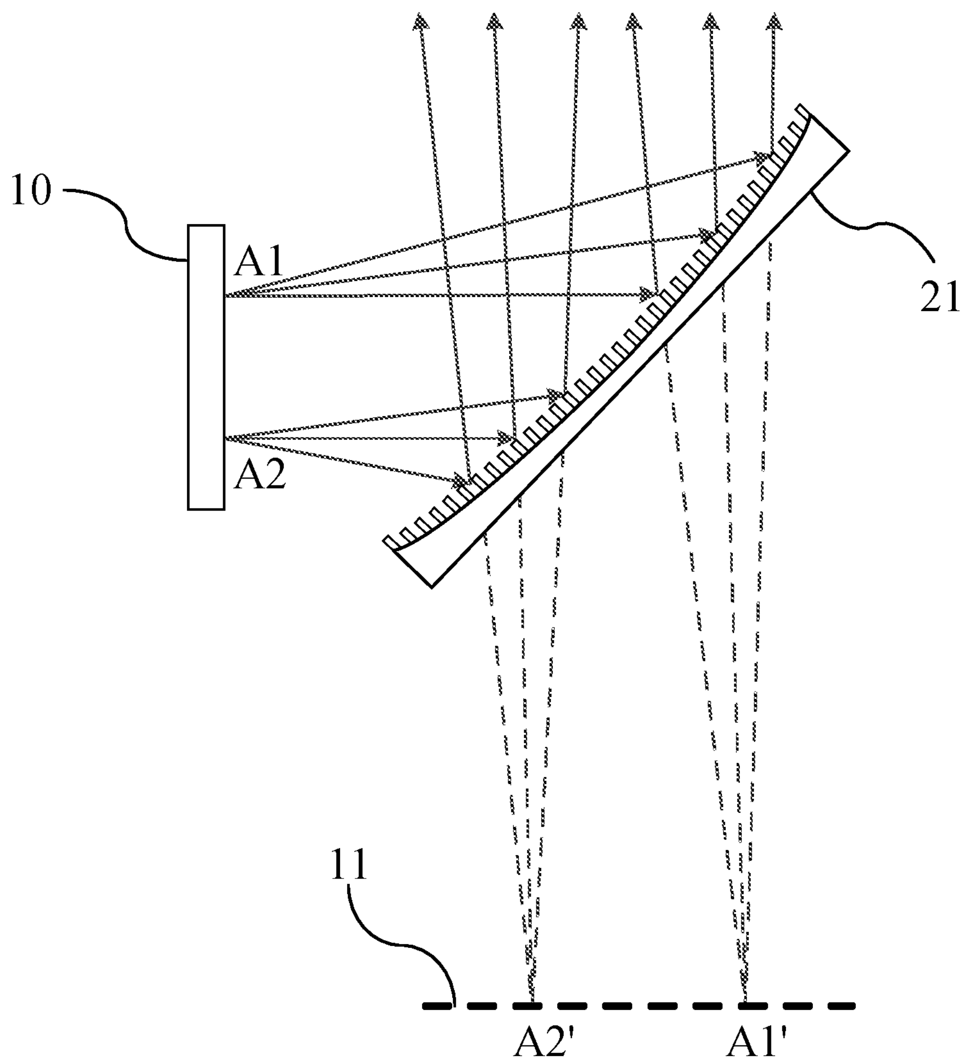
FIG. 7 schematically shows a second structure of an image generator according to an embodiment of the present disclosure.

Optionally, as shown in FIG. 2, the reflective metasurface 21 may be of a planar structure when being regarded as a whole. Where, the reflective layer 211 and the substrate layer 212 are of a planar structure; and a plurality of nanostructures 200 are distributed along a plane. Alternatively, as shown in FIG. 7, the reflective metasurface 21 may be of a concave structure when being regarded as a whole. For example, a reflective surface of the reflective layer 211 may curve inwards, or the substrate layer 212 may curve inwards. In this case, the plurality of nanostructures 200 are arranged on a corresponding concave curved surface, and the plurality of nanostructures 200 are distributed along the concave curved surface. The concave curved surface may be a concave free-form surface.

Compared with the reflective metasurface 21 being of a planar structure, the reflective metasurface 21 that curves inwards is capable of integrating some of intrinsic curved features into the substrate layer 212, thereby lowering the design difficulties of the metasurface (especially the metasurface for aberration correction in a wide spectrum). The use of the reflective metasurface 21 being of a concave structure can further reduce the size of the amplifier, which is more conducive to miniaturization in the design.

Figure 8:
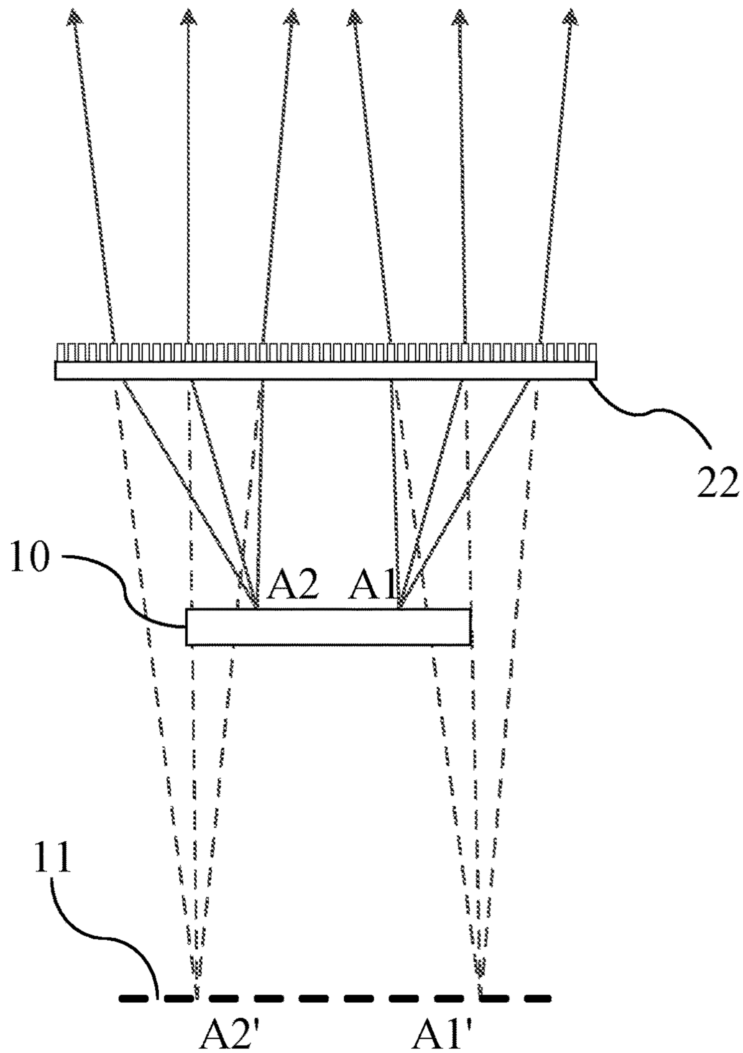
FIG. 8 schematically shows a third structure of an image generator according to an embodiment of the present disclosure.

Based on the above embodiments, the metasurface 20 adjusts the propagation direction of outgoing imaging light by the way of transmission, so as to adjust the divergence angle of the imaging light hitting the metasurface 20, thereby forming an enlarged virtual image. As shown in FIG. 8, the metasurface 20 includes a transmissive metasurface 22. The imaging light emitted by the image source 10 passes through the transmissive metasurface 22. The transmissive metasurface 22 is configured to reduce the divergence angle of the imaging light entering the transmissive metasurface 22, so that the reverse extension line of the light transmitted by the transmissive metasurface 22 passes through the enlarged virtual image 11, thereby forming the enlarged virtual image 11. As shown in FIG. 8, the imaging light emitted by the pixel points A1 and A2 of the image source 10 passes through the transmissive metasurface 22 and forms corresponding virtual images A1' and A2' at a distance.

Where, the transmissive metasurface 22 includes a plurality of transmissive unit cells. The transmissive unit cells are transmissive to incident imaging light entering the transmissive unit cells, and are configured to adjust a propagation direction of outgoing imaging light passing through the transmissive unit cells, so as to reduce the divergence angle of the imaging light entering the transmissive metasurface 22; and the outgoing imaging light passing through the transmissive unit cells is capable of forming the enlarged virtual image 11.

In the present embodiment, the configuration of "the transmissive metasurface 22 includes a plurality of transmissive unit cells" is intended to express that the transmissive metasurface 22 is abstractively divided into a plurality of transmissive unit cells, and is not intended to limit the plurality of transmissive unit cells to be completely independent of each other in structure. The plurality of transmissive unit cells may be in one piece, or, at least a part of transmissive unit cells are independent in structure. In an embodiment, different transmissive unit cells are arranged on a same substrate, optionally, different transmissive unit cells are arranged at different positions of the same substrate. Respective transmissive unit cells are partial structures obtained by conceptually partitioning the transmissive metasurface 22.

Optionally, the transmissive metasurface 22 is provided with a transmission reference position, which is coplanar with the transmissive metasurface 22. The transmission reference position may be a certain position on the transmissive metasurface 22, such as a center of the transmissive metasurface 22; or, the transmission reference position may also be outside the transmissive metasurface 22, but be coplanar with the transmissive metasurface 22. Generally, a certain position on the transmissive metasurface 22 is selected as the transmission reference position. The transmissive unit cells in the transmissive metasurface 22 adjust the propagation direction of transmitted light based on the transmission reference position, so that a first deflection angle of the incident imaging light entering the transmissive unit cells relative to the transmission reference position is larger than a second deflection angle of the outgoing imaging light passing through the transmissive unit cells relative to the transmission reference position.

In the present embodiment, the transmissive unit cells are transmissive to incident imaging light entering the transmissive unit cells, and are configured to adjust a propagation direction of outgoing imaging light passing through the transmissive unit cells. Whereby, the outgoing imaging light passing through the transmissive unit cells tends to be closer to the transmission reference position, when being compared to the incident imaging light entering the transmissive unit cells. That is, the transmitted light is more biased toward the transmission reference position, compared to the incident light. As shown in FIG. 8, the transmission reference position is located in a middle of the transmissive metasurface 22. After being modulated by the transmissive metasurface 22, the outgoing light is closer to the transmission reference position. Additionally, in order to form an enlarged virtual image 11, an included angle is positively correlated to a distance from respective transmissive unit cells to the transmission reference position, where the included angle refers to an angle between outgoing light and incident light entering the transmissive unit cells at different positions along the same incident direction. That is, when the transmissive unit cells are further away from the transmission reference position, the degree of the modulation of the transmissive unit cells to the incident light is greater. In other words, the included angle between the incident light and the transmitted light is larger. FIG. 8 shows three imaging light beams emitted from a pixel point A2. In FIG. 8, the transmission reference position is located at a center of the transmissive metasurface 22, so respective transmissive unit cells corresponding to three imaging light beams from left to right gradually approach the transmission reference position, implying that the modulation effect of the three corresponding transmissive unit cells to the incident imaging light gradually becomes weaker. A transmissive unit cell located at the transmission reference position may not adjust a propagation direction of the light passing through the transmissive unit cell, so that the propagation direction of the incident light is the same as the propagation direction of the outgoing light.

The present embodiment is described based on the deflection angle of a propagation direction of incident light (an incident direction or a transmissive direction) relative to the transmission reference position. Specifically, a first deflection angle refers to a deflection angle of the incident light entering the transmissive unit cells relative to the transmission reference position; and a second deflection angle refers to a deflection angle of the outgoing imaging light passing through the transmissive unit cells relative to the transmission reference position. Where, a deflection angle of a light propagation direction relative to the transmission reference position is intended to express an included angle between the light propagation direction and a direction from the transmissive unit cell where the incident light enters to the transmission reference position. For example, for a light beam entering a transmissive unit cell M, a first deflection angle thereof refers to an included angle between the incident direction and a direction from the transmissive unit cell M to the transmission reference position.

Since the outgoing light tends to be closer to the transmission reference position, thus, the second deflection angle is less than or equal to the first deflection angle. Additionally, for respective transmissive unit cells positioned differently, in the case that respective first deflection angles are the same, if a distance between a transmissive unit cell and the transmission reference position is smaller, the modulation effect of the transmissive unit cell to the light is weaker, that is, an included angle between the incident direction and the outgoing direction (a difference between the first deflection angle and the second deflection angle) is smaller.

Figure 9:
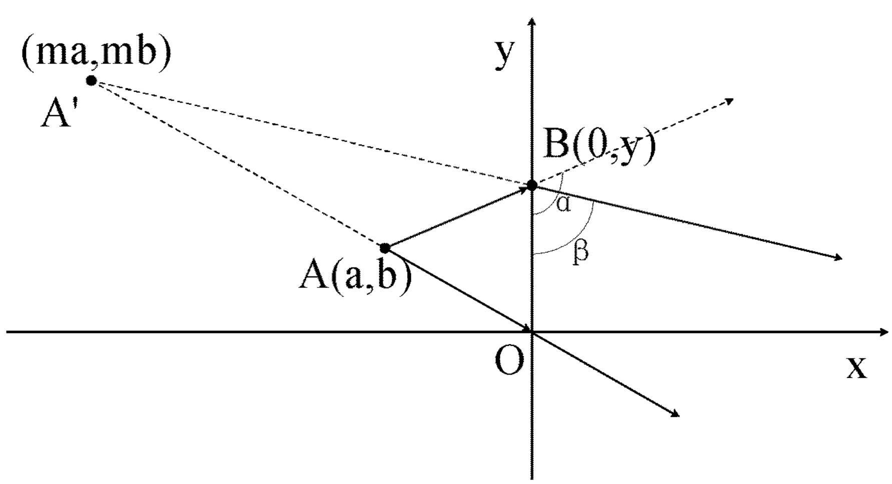
FIG. 9 schematically shows an imaging principle of a perspective metasurface based on a coordinate system according to an embodiment of the present disclosure.

In the present embodiment, the transmission reference position corresponds to the principal optic axis of the transmissive metasurface 22. The principal optic axis is generally perpendicular to a plane where the transmissive metasurface 22 is located. Therefore, the transmissive metasurface 22 and the principal optic axis thereof together establish a coordinate system. Referring to FIG. 9, the transmission reference position of the transmissive metasurface 22 acts as an origin O of the coordinate system. A line coincident with the transmissive metasurface 22 is a y-axis of the coordinate system. The principal optic axis passing through the transmission reference position O is an x-axis of the coordinate system. Where, for light passing through the transmission reference position O, an incident direction thereof is the same as an outgoing direction thereof. A certain pixel point of the image source 10 is marked as a pixel point A. Coordinates of the pixel point A are (a, b). Since a propagation direction of light passing through the transmission reference position O remains unchanged before and after the transmission, it is required to ensure that a virtual image A' formed by the pixel point A of the image source 10 is located on a reverse extension line of the incident light AO, so as to form an enlarged virtual image. Coordinates of the virtual image A' are (ma, mb), if the enlarged virtual image is m times larger than an image of the image source 10.

Taking a transmissive unit cell B on the transmissive metasurface 22 shown in FIG. 9 as an example for the explanation purpose, coordinates of the transmissive unit cell B are (0, y), thus, light propagating from the pixel point A to the transmissive unit cell B is marked as light AB, and an incident direction of the light AB is $\overrightarrow{AB}$; a reverse extension line of the outgoing light passing through the transmissive unit cell B needs to pass through the virtual image A', so as to form an enlarged virtual image, so, a propagation direction of the transmitted light may be expressed as $\overrightarrow{A'B}$.

Based on coordinates of the point A, the point B and the point A', there are the following equations: $\overrightarrow{AB}=(-a, y-b)$, $\overrightarrow{A'B}=(-ma, y-mb)$, and a direction from the transmissive unit cell B to the transmission reference position O is expressed as $\overrightarrow{BO}=(0,-y)$. As shown in FIG. 9, an included angle between $\overrightarrow{AB}$ and $\overrightarrow{BO}$ is α, that is, the first deflection angle is α; an included angle between $\overrightarrow{A'B}$ and $\overrightarrow{BO}$ is β, that is, the second deflection angle is β; an included angle between $\overrightarrow{AB}$ and $\overrightarrow{A'B}$ is α−β, and α≥β. Based on the above, the following formula is obtained:

$$\cos\beta=\frac{\overrightarrow{BO}\square\overrightarrow{A'B}}{|\overrightarrow{BO}|\times|\overrightarrow{A'B}|}=\frac{-y\times(y-mb)}{\sqrt{y^2}\times\sqrt{m^2a^2+(y-mb)^2}}$$

when y is greater than 0, y represents a distance from the transmissive unit cell B to the transmission reference position O. If y<mb, then mb−y>0, the following formula is obtained:

$$\cos\beta=\frac{1}{\sqrt{\frac{m^2a^2}{(mb-y)^2}+1}},$$

the formula obtained herein is applicable to any light propagating from any point (a, b) to any transmissive unit cell B (0, y) whose y value meets a condition of 0<y<mb. Transmissive unit cells at different positions may have different y values. For incident light from the same pixel point, the transmissive unit cells at different positions deflect the incident light to different degrees, so the obtained second deflection angles are different. For example, the determination of the pixel point A means fixed values of a and b. According to the above formula, when a distance y between the transmissive unit cell B and the transmission reference position O is greater, a value of cos β is smaller, which means that the second deflection angle β is greater since the value of the cosine function monotonically decreases between 0 and π.

In addition, for the transmissive unit cells at different positions, in order to ensure that the first deflection angles of the incident light are the same, an incident direction of the incident light is parallel to $\overrightarrow{AB}$, as shown in the coordinate system of FIG. 9. Thus, when incident light emitted from the pixel point (a, b+Δd) propagates towards a transmissive unit cell at (0, y+Δd), the incident light is parallel to the light beam AB of FIG. 9, and both of the incident light and the the light beam AB have the same first deflection angle. Where, Δd represents an offset of the distance. Therefore, when incident light with a first deflection angle of α passes through the transmissive unit cell at (0, y+Δd), a cosine value of the second deflection angle of the outgoing light is shown as follows:

$$\frac{1}{\sqrt{\frac{m^2a^2}{(m(b+\Delta d)-(y+\Delta d))^2}+1}},$$

that is:

$$\frac{1}{\sqrt{\frac{m^2a^2}{(mb-y+(m-1)\Delta d)^2}+1}}.$$

Since the virtual image is enlarged, m>1; if Δd is positive, it is deducted that the transmissive unit cell at (0, y+Δd) is farther from the transmission reference position, compared with the transmissive unit cell at (0, y); and a cosine value of the second deflection angle of the transmissive unit cell at (0, y+Δd) is greater than a cosine value of the second deflection angle of the transmissive unit cell at (0, y). Since the value of the cosine function monotonically decreases between 0 and π, the second deflection angle of the transmissive unit cell at (0, y+Δd) is smaller than the second deflection angle of the transmissive unit cell at (0, y). That is, in the case that the first deflection angles are the same, the second deflection angle of the transmissive unit cell at (0, y+Δd) is smaller than the transmissive unit cell at (0, y). In other words, when the transmissive unit cell is farther from the transmission reference position, the degree of deflection of light by the transmissive unit cell (the difference α–β between the first deflection angle and the second deflection angle) is greater.

To sum up, for the transmissive unit cell being farther from the transmission reference position, the second deflection angle thereof is greater when the incident light emitted from the same pixel point passes through the transmissive unit cell, but the second deflection angle thereof is smaller when the incident light having the same first deflection angle passes through the transmissive unit cell. Analogously, the above conclusion is also attainable when y>mb or y<0, and the detailed derivation will not be repeated herein. Whereby, the transmissive metasurface 22 is capable of forming an enlarged virtual image.

It is understandable to those skilled in the art that FIG. 9 only shows a cross-section of the transmissive metasurface 22 where the principal optic axis of the transmissive metasurface 22 resides, however, the transmissive metasurface is three-dimensional. Thus, in the case that the incident light is not coplanar with the principal optic axis, even if the incident direction is not parallel to a direction $\overrightarrow{AB}$ shown in FIG. 9, the first deflection angle of the incident light may still be equal to the first deflection angle of the incident light in FIG. 9.

In addition, optionally, as for a certain transmissive unit cell at a fixed distance from the transmission reference position and as for at least part of incident light passing through the certain transmissive unit cell, a difference between a cotangent value of the second deflection angle and a cotangent value of the first deflection angle is a constant value; and the constant value is positively correlated to a distance between the certain transmissive unit cell and the transmission reference position.

Referring to FIG. 9, a direction $\overrightarrow{A'B}$ may be expressed as follows: $\overrightarrow{A'B}$=(−ma, y−mb), where the direction $\overrightarrow{A'B}$ may also be expressed as follows:

$$\overrightarrow{A'B}=\left(-a,\ \frac{y}{m}-b\right).$$

Supposing c=y−b, and $$d=\frac{y}{m}-y,$$

the expression of the direction $\overrightarrow{AB}$ is obtained as follows: $\overrightarrow{AB}$=(−a, c); the expression of the direction $\overrightarrow{A'B}$ is obtained as follows: $\overrightarrow{A'B}$=(−a, c+d), where (−a, c+d) may be representation of $\overrightarrow{A'B}$, when expressing the angle.

Based on sum and difference identities of trigonometric functions $$\cot\alpha-\cot\beta=-\frac{\sin(\alpha-\beta)}{\sin\alpha\ \sin\beta},$$

the following is obtained:

$$(\cot\alpha-\cot\beta)^2=\frac{1-\cos^2(\alpha-\beta)}{(1-\cos^2\alpha)(1-\cos^2\beta)}=\frac{1-\frac{\left(\overrightarrow{AB}\square\overrightarrow{A'B}\right)^2}{\left(|\overrightarrow{AB}|\times|\overrightarrow{A'B}|\right)^2}}{\left(1-\frac{\left(\overrightarrow{AB}\square\overrightarrow{BO}\right)^2}{\left(|\overrightarrow{AB}|\times|\overrightarrow{BO}|\right)^2}\right)\left(1-\frac{\left(\overrightarrow{BO}\square\overrightarrow{A'B}\right)^2}{\left(|\overrightarrow{BO}|\times|\overrightarrow{A'B}|\right)^2}\right)}=\frac{\left(|\overrightarrow{AB}|\times|\overrightarrow{A'B}|\right)^2-\left(\overrightarrow{AB}\square\overrightarrow{A'B}\right)^2}{\left[|\overrightarrow{AB}|^2-\frac{\left(\overrightarrow{AB}\square\overrightarrow{BO}\right)^2}{|\overrightarrow{BO}|^2}\right]\left[|\overrightarrow{A'B}|^2-\frac{\left(\overrightarrow{BO}\square\overrightarrow{A'B}\right)^2}{|\overrightarrow{BO}|^2}\right]}$$

When using (−a, c+d) as the substitution of $\overrightarrow{A'B}$, and based on $\overrightarrow{AB}$=(−a, c), and $\overrightarrow{BO}$=(0,−y); the following is obtained:

$$(\cot\alpha-\cot\beta)^2=\frac{(a^2+c^2)(a^2+c^2+2cd+d^2)-(a^2+c^2+cd)^2}{\left[(a^2+c^2)-\frac{c^2y^2}{y^2}\right]\left[(a^2+c^2+2cd+d^2)-\frac{(c+d)^2y^2}{y^2}\right]}=\frac{(a^2+c^2)^2+(a^2+c^2)(2cd+d^2)-(a^2+c^2)^2-2cd(a^2+c^2)-c^2d^2}{a^2\times a^2}=\frac{(a^2+c^2)d^2-c^2d^2}{a^4}=\frac{d^2}{a^2}=\frac{(1-m)^2}{a^2m^2}y^2$$

Since 180°>α≥β>0 and the cotangent function decreases monotonically in this interval, a difference between the cotangent value cot β of the second deflection angle and the cotangent value cot β of the first deflection angle is not less than 0. That is $$\cot\beta - \cot\alpha = \left|\frac{1-m}{am}\right||y|,$$

where |y| represents a distance from the transmissive unit cell to the transmission reference position, i.e., a distance between the point B and the origin O as shown in FIG. 9. Since the magnification m of the image source 10 is preset and positions of the image source 10 and the transmissive metasurface 22 are fixed in actual working conditions, the distance |a| between the image source 10 and the transmissive metasurface 22 is fixed and a value of cot β–cot α is constant. Additionally, when the transmissive unit cell is farther from the transmission reference position O, the value of Cot β-cot α is greater. On the other hand, the transmissive unit cells at different positions that meet the above conditions enable the reverse extension line of the transmitted light to pass through the corresponding virtual image as much as possible, thereby improving the imaging performances of the transmissive metasurface 22.

Optionally, an optical axis of the imaging light emitted by the image source 10 is parallel to a principal optic axis of the transmissive metasurface 22. For example, in the case where the transmissive metasurface 22 is of a planar structure, the image source 10 may be parallel to the transmissive metasurface 22. By configuration of rendering the optical axis of the imaging light emitted by the image source 10 parallel to the principal optic axis of the transmissive metasurface 22, it is feasible to design the transmissive metasurface 22 to be symmetrical, thereby facilitating the design and the fabrication of the transmissive metasurface 22.

Figure 10:
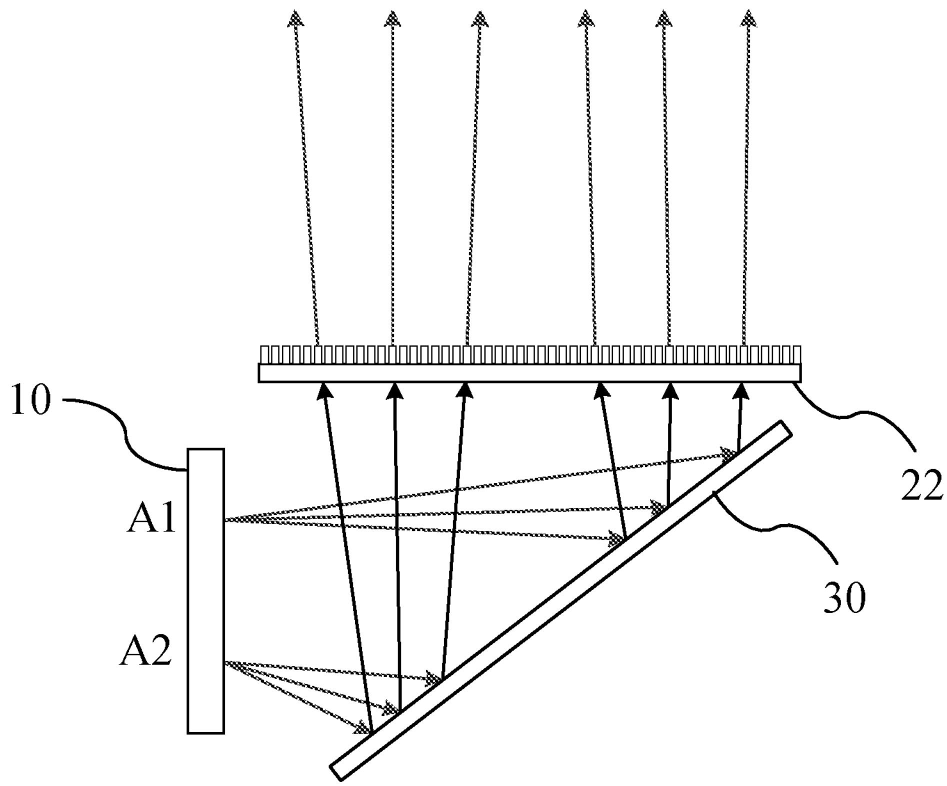
FIG. 10 schematically shows a fourth structure of an image generator according to an embodiment of the present disclosure.

In an optional embodiment, referring to FIG. 10, the image generator further includes a reflective element 30. The image source 10 and the transmissive metasurface 22 are provided on a same side of the reflective element 30, for example, on an upper left side of the reflective element 30 as shown in FIG. 10. The reflective element 30 is configured to reflect imaging light incident on the reflective element 30 to the light-outgoing area of the image generator. The reflective element 30 may be of a planar structure or a concave structure, and the present embodiment is not limited thereto. The arrangement of the reflective element 30 in the present embodiment is configured to adjust an optical axis of the imaging light emitted by the image source 10, so as to reduce the volume of the image generator, for example, reduce a length of the image generator in a vertical direction. In addition, when the space is limited, the set position of the image source 10 can be adjusted easily to be appropriate.

Referring to FIG. 10, the image source 10, the transmissive metasurface 22 and the reflective element 30 are not collinear. The reflective element 30 is configured to reflect the imaging light emitted from the image source 10 to the transmissive metasurface 22. That is, the imaging light emitted from the image source 10 is firstly reflected by the reflective element 30, and then is transmitted by the transmissive metasurface 22.

Or, the image source 10, the transmissive metasurface 22 and the reflective element 30 are collinear. The transmissive metasurface 22 is arranged between the image source 10 and the reflective element 30. The reflective element 30 is configured to reflect the imaging light transmitted by the transmissive metasurface 22. That is, the imaging light emitted from the image source 10 firstly passes through the transmissive metasurface 22 and then is reflected by the reflective element 30.

Figure 11:
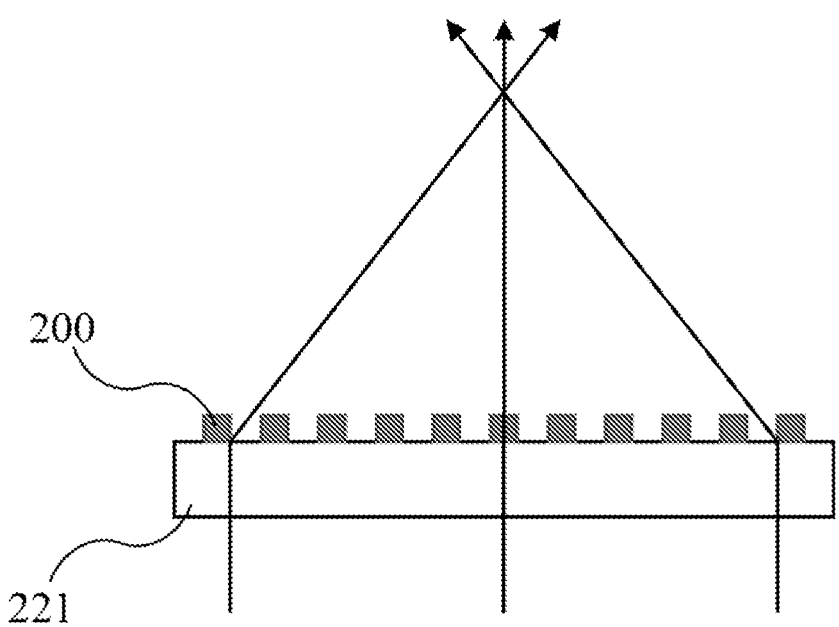
FIG. 11 schematically shows a structure of a transmissive metasurface according to an embodiment of the present disclosure.

Optionally, in order to enable the imaging light to pass through the transmissive metasurface 22, materials of the transmissive metasurface 22 are transmissive to visible light. Referring to FIG. 11, the transmissive metasurface 22 includes a transparent substrate layer 221 and a plurality of nanostructures 200 arranged on the transparent substrate layer 221.

The transparent substrate layer 221 is transparent in the visible spectrum, and materials of the transparent substrate layer 221 may be quartz glass, crown glass, flint glass, etc. The nanostructures 200 are also transparent in the visible spectrum, and materials of the nanostructures 200 may be titanium oxide, silicon oxide, silicon nitride, gallium nitride, gallium phosphide, aluminum oxide, hydrogenated amorphous silicon, etc. Optionally, a gap between the nanostructures 200 may be filled with filler materials, and the filler materials may be air or other materials that are transparent in the visible spectrum. In addition, a difference between the refractive index of the filler materials and the refractive index of the nanostructures 200 needs to be greater than or equal to 0.5. Where, the transparent substrate layer 221, the nanostructures 200, and the filler materials between the nanostructures 200 are different from each other in material.

Based on any of the above embodiments, the imaging light emitted from the image source 10 is polarized light, such as linearly polarized light. Optionally, the image source 10 may include a first display capable of emitting polarized light; and the first display may be a liquid crystal display or the like. Optionally, the image source 10 includes a second display, a polarizer and a quarter-wave plate; both of the polarizer and the quarter-wave plate are arranged between the second display and the metasurface; and the light emitted from the second display sequentially passes through the polarizer and the quarter-wave plate, and finally reaches the metasurface 20. Where, the polarizer converts the imaging light emitted from the second display into circularly polarized light, and then the quarter-wave plate converts the circularly polarized light into linearly polarized light, which facilitates the nanostructures 200 to modulate the linearly polarized imaging light.

In order to better modulate the polarized light, the nanostructures 200 may be of a structure sensitive to polarized light (also referred to as a polarization-dependent structure). The polarization-dependent structure imposes a propagation phase on the incident light, which facilitates the design of the nanostructures 200 and lowers the design difficulties of the metasurface 20. In the present embodiment, the nanostructures 200 in both the reflective metasurface 21 and the transmissive metasurface 22 may be of a structure sensitive to polarized light.

Figure 12:
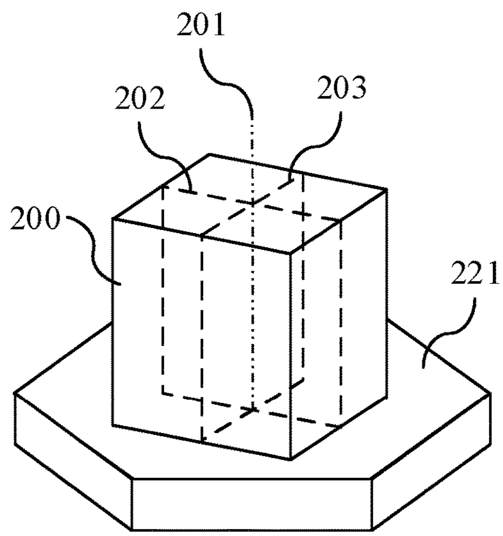
FIG. 12 schematically shows unit cells of a metasurface according to an embodiment of the present disclosure.

As shown in FIG. 12, a nanostructure 200 is of an upright structure with a central axis 201 in a height direction of the nanostructure 200; and the upright structure may be a pillar structure. The nanostructure 200 includes a first plane 202 and a second plane 203 that pass through the central axis 201 and are perpendicular to each other; intersection of the respective nanostructures with the first plane forms a first intersection line, and intersection of the respective nanostructures with the second plane forms a second intersection line; the second intersection line does not coincide completely with the first intersection line after rotating 90° around the central axis.

As shown in FIG. 12, an intersection line of the first plane 202 and the second plane 203 is the central axis 201; intersection of the respective nanostructures with the first plane forms a first intersection line, and intersection of the respective nanostructures with the second plane forms a second intersection line; the first intersection line and the second intersection line are represented by a dashed lines in FIG. 12. As for the nanostructure 200 which is polarization-dependent, one of the first intersection line and the second intersection line after rotating 90° around the central axis does not coincide completely with the other one of the first intersection line and the second intersection line. For example, the nanostructure may be a square prism that is not a regular, that is, a cross-sectional shape of the nanostructure 200 on a plane perpendicular to the central axis 201 is rectangular; or the nanostructure 200 may be a prism with an odd number of lateral edges, for example, being a triangular prism, a pentagonal prism, etc.; or, the nanostructure 200 may be a prism with 4n+2 lateral edges (where n is a positive integer), for example, being a hexagonal prism, a decagon prism, etc.; or, the nanostructure 200 is an elliptical prism, etc.

FIG. 12 shows an example in which the nanostructure 200 is arranged on the transparent substrate layer 221. The nanostructure 200 may also be arranged on the substrate layer 212, which is not intended to limit the present embodiment. Moreover, FIG. 12 shows an unit cell which is conceptually divided. Taking a transmissive unit cell as an example, a shape of the transparent substrate layer 221 corresponding to the transmissive unit cell may be different according to different dividing methods. In addition, the unit cell shown in FIG. 12 is only illustrative, and is not intended to limit the unit cell to have the dimension and the dimensional proportion as shown in FIG. 12. The unit cells with the required size may be designed or selected according to actual needs.

Figure 13:
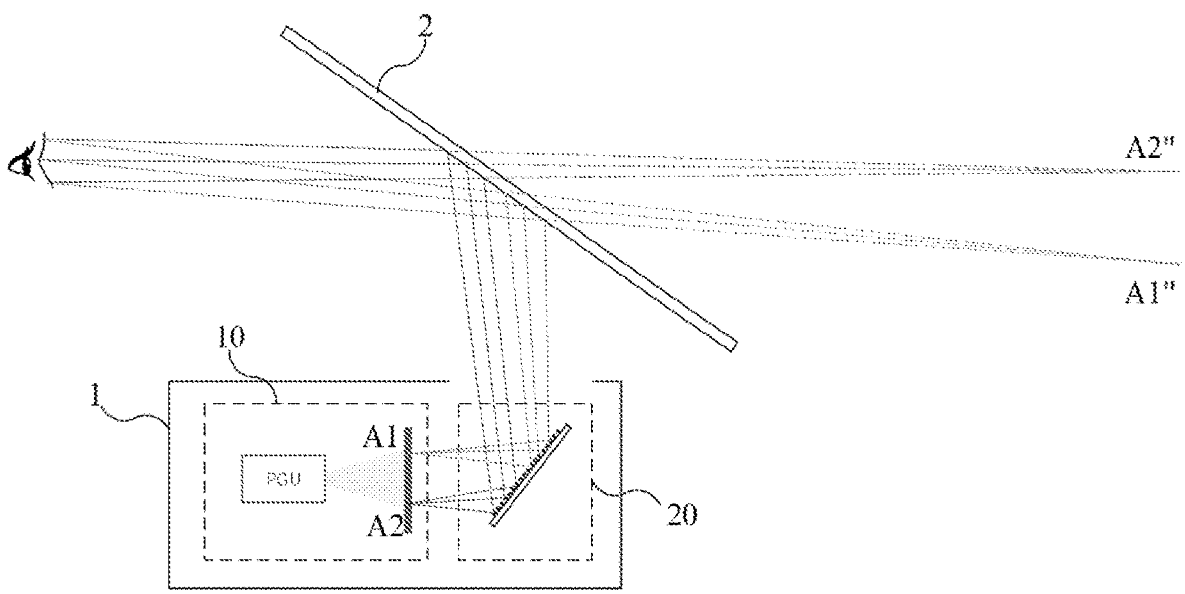
FIG. 13 schematically shows a first structure of a head-up display according to an embodiment of the present disclosure.

Based on the same inventive concept, a head-up display is provided, as shown in FIG. 13. The head-up display includes a reflective imaging device 2 and the image generator 1 as disclosed in any of the above embodiments. The reflective imaging device 2 is configured to reflect outgoing imaging light leaving the image generator 1 to an observation area, such that, human eyes in the observation area can view the image formed by the reflective imaging device 2. The observation area may be referred to as an eye box.

In FIG. 13, the image source 10 of the image generator 1 includes a picture generation unit (PGU) and a diffuser. The PGU projects an image to be displayed onto the diffuser. The diffuser is used as an intermediate image plane and is used to emit the imaging light. The metasurface 20 of the image generator 1 includes a reflective metasurface 21 which quasi-reflects the imaging light to the light-outgoing area of the image generator 1. If the image generator 1 has a casing, the casing of the image generator 1 at the light-outgoing area is provided with an opening, or the casing is transparent to visible light. As shown in FIG. 13, the reflective imaging device 2 is configured to reflect the imaging light emitted from the image generator 1, thereby forming a corresponding virtual image on a side of the reflective imaging device 2. For two pixel points A1 and A2 in the image source 10, virtual images thereof formed by the reflective imaging device 2 are respectively A1" and A2". The virtual images A1" and A2" also correspond to virtual images A1' and A2' formed by the metasurface 20, respectively.

Figure 14:
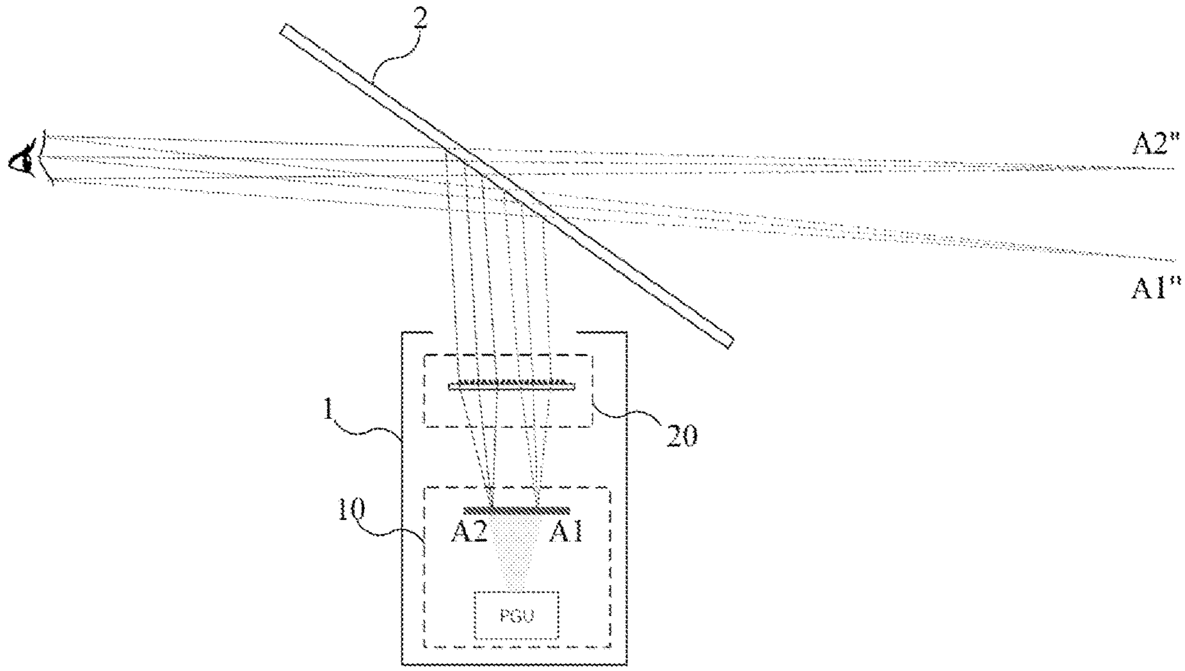
FIG. 14 schematically shows a second structure of a head-up display according to an embodiment of the present disclosure.

As shown in FIG. 14, the metasurface 20 of the image generator 1 may include a transmissive metasurface 22, so as to adjust a divergence angle of the imaging light by the way of transmission. Or, as shown in FIG. 15, the image generator 1 further includes a reflective element 30 to reduce a length of the image generator 1 in a vertical direction, thereby rendering a shape of the image generator 1 more reasonable.

Figure 15:
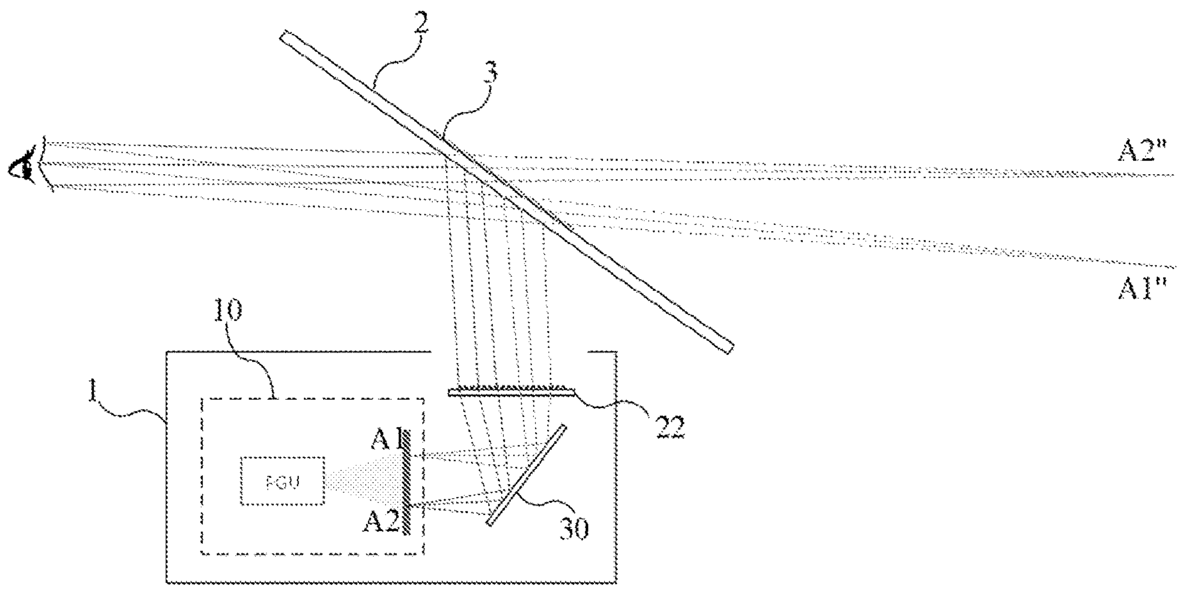
FIG. 15 schematically shows a third structure of a head-up display according to an embodiment of the present disclosure.

In addition, as shown in FIG. 15, the head-up display may also include an anti-reflection film 3. The anti-reflection film 3 is provided on a side of the reflective imaging device 2 away from the image generator 1.

Figure 16:
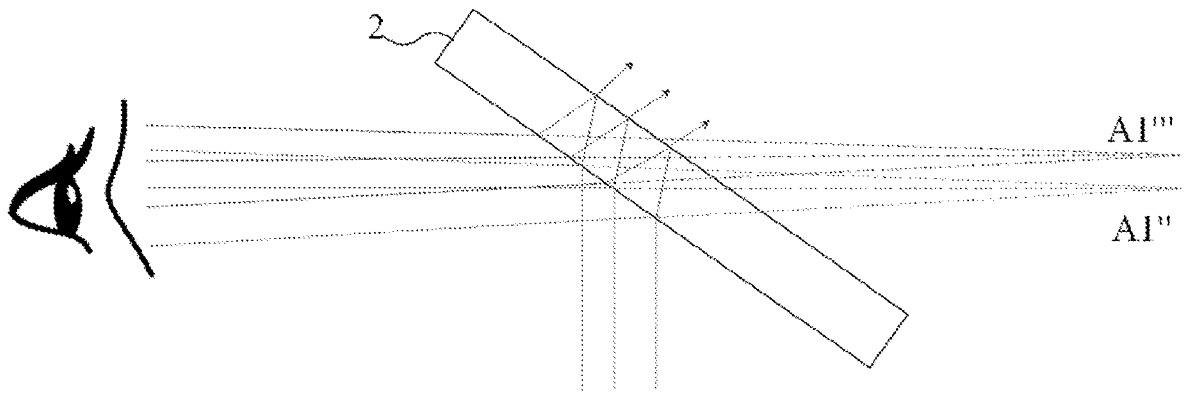
FIG. 16 is an imaging diagram of a head-up display in which an anti-reflection film is absent according to an embodiment of the present disclosure.

In the case of absence of the anti-reflection film 3, referring to FIG. 16, since the reflective imaging device 2 (may be a windshield) has a certain thickness, part of the imaging light being emitted from the image generator 1 and reaching the reflective imaging device 2 is reflected by a first side of the reflective imaging device 2 close to the image generator 1 (i.e., a lower left side of the reflective imaging device 2 as shown in FIG. 16), and the reflected imaging light forms a virtual image A1", which can be viewed by human eyes. Moreover, another part of the imaging light penetrates the reflective imaging device 2 from the side of the reflective imaging device 2 close to the image generator 1 to travel all the way through and then reach a second side of the reflective imaging device 2 away from the image generator 1 (i.e., an upper right side of the reflective imaging device 2 as shown in FIG. 16). The second side of the reflective imaging device 2 transmits a part of the light, and/or reflects another part of the light, causing the reflected light to hit again and penetrate the first side of the reflective imaging device 2, so as to reach the human eyes, thereby forming another virtual image A1'''. Since the virtual image A1''' is the same as the virtual image A1", the problem of ghosting occurs.

Figure 17:
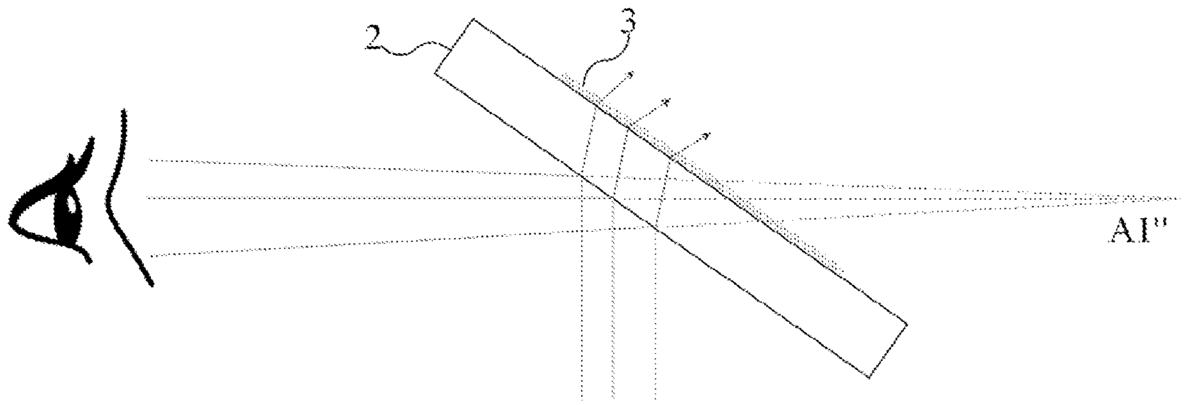
FIG. 17 is an imaging diagram of a head-up display in which an anti-reflection film is present according to an embodiment of the present disclosure.

Referring to FIG. 17, an anti-reflection film 3 is provided on the second side of the reflective imaging device 2. The anti-reflection film 3 is attached to the reflective imaging device 2. The anti-reflection film 3 is capable of improving the transmittance of light, so that most or even all of the light reaching the anti-reflection film 3 can be transmitted, thereby preventing the formation of the virtual image A1''' and thus avoiding the problem of ghosting.

The present embodiment further provides a vehicle, such as a car, which includes a head-up display as provided in any of the above embodiments.

The embodiments of the present disclosure mentioned above are illustrative, and are not intended to limit the present disclosure. The scope of the embodiments of the present disclosure is not limited thereto. All variations, substitutions or improvements based on the spirits and principles of the present disclosure fall within the scope of the present disclosure. Accordingly, the scope of the present application is defined by the appended claims.

What is claimed is:

1. An image generator, comprising:

an image source and a metasurface;

wherein the metasurface is provided at a light-outgoing side of the image source;

the image source is configured to emit imaging light, and the imaging light is capable of propagating towards the metasurface; and the metasurface comprises a reflective metasurface, and the metasurface is configured to modulate incident imaging light hitting the metasurface and reduce a divergence angle of the imaging light, so as to adjust a propagation direction of outgoing imaging light leaving the metasurface and direct the outgoing imaging light leaving the metasurface towards a light-outgoing area of the image generator; and the metasurface is also configured to form an enlarged virtual image of the image source, wherein a reverse extension line of the outgoing imaging light leaving the reflective unit cells passes through the enlarged virtual image, such that the enlarged virtual image of the image source is formed.

2. The image generator according to claim 1, wherein the reflective metasurface comprises a plurality of reflective unit cells; the reflective unit cells are configured to modulate at least part of incident imaging light hitting the reflective unit cells to modulate a propagation direction of outgoing imaging light leaving the reflective unit cells.

3. The image generator according to claim 2, wherein an opening formed between the at least part of the incident imaging light hitting the reflective unit cells and the outgoing imaging light leaving the reflective unit cells faces towards a first reflection reference position that is preset; and the reflective unit cells are configured to modulate incident imaging light vertically hitting the reflective unit cells and direct corresponding outgoing imaging light to a second reflection reference position that is preset; and both the first reflection reference position and the second reflection reference position are arranged on a side of the reflective metasurface close to the image source; and a distance between the first reflection reference position and the reflective metasurface is greater than a distance between the second reflection reference position and the reflective metasurface.

4. The image generator according to claim 3, wherein a difference between a first distance and a second distance is less than a preset value; the first distance refers to a distance between the incident imaging light hitting the reflective unit cells and the first reflection reference position in a direction perpendicular to a principal optic axis of the reflective metasurface; and the second distance refers to a distance between the outgoing imaging light leaving the reflective unit cells and the first reflection reference position in the direction perpendicular to the principal optic axis of the reflective metasurface.

5. The image generator according to claim 4, wherein the distance between the first reflection reference position and the reflective metasurface is twice the distance between the second reflection reference position and the reflective metasurface; and the first distance is equal to the second distance.

6. The image generator according to claim 2, wherein the reflective metasurface comprises a reflective layer, a substrate layer and a plurality of nanostructures;

the reflective layer is adhered to the substrate layer; and the nanostructures are provided on a side of the reflective layer close to the image source.

7. The image generator according to claim 6, wherein the substrate layer is provided on a side of the reflective layer away from the image source; the nanostructures are provided on the reflective layer, and provided on the side of the reflective layer close to the image source; or the substrate layer is transparent; the substrate layer is provided on the side of the reflective layer close to the image source; and the nanostructures are provided on the substrate layer, and provided on a side of the substrate layer close to the image source.

8. The image generator according to claim 6, wherein the nanostructures are provided on a flat surface; or the nanostructures are provided on an inwardly curved surface.

9. The image generator according to claim 6, wherein the imaging light is polarized;

respective nanostructures have a pillar structure with a central axis in a height direction of the respective nanostructures; and intersection of the respective nanostructures with a first plane forms a first intersection line, and intersection of the respective nanostructures with a second plane form a second intersection line; the first plane and the second plane are perpendicular to each other and both pass through the central axis; the second intersection line does not coincide completely with the first intersection line after rotating 90° around the central axis.

10. The image generator according to claim 9, wherein the image source comprises a first display capable of emitting polarized light; or the image source comprises a second display, a polarizer and a quarter-wave plate, and both the polarizer and the quarter-wave plate are arranged between the second display and the metasurface; light emitted from the second display hits the metasurface after passing through the polarizer and the quarter-wave plate in sequence.

11. A head-up display, comprising: the image generator of claim 1 and a reflective imaging device; and the reflective imaging device is configured to reflect outgoing imaging light leaving the image generator to an observation area.

12. The head-up display according to claim 11, further comprising an anti-reflection film; and the anti-reflection film is provided on a side of the reflective imaging device away from the image generator.

13. A vehicle, comprising the head-up display of claim 11.

* * * * *